March 18, 1924.  
B. F. TOZIER  
1,487,041

MEANS FOR PREVENTING VEHICLE THEFTS AND RECOVERY OF STOLEN VEHICLES

Filed Oct. 28, 1921   3 Sheets-Sheet 1

| Board of Assessors Notice of Registration in | | |
|---|---|---|
| City or Town of | State | Date |
| Name of owner | Address | St. & No. |
| Name of Vehicle | Eng. no. | Maker's No.  Year |
| Model No. | Letter | Value $ |
| From whom did you purchase Vehicle | Name | |
| Address  St. & No. | City or Town | State of |
| Police Inspector's Report  Name | No. if any  City or Town | State of |

| Reg. No. | Reg. No. | Reg. No. |
|---|---|---|
| Receipt of Registration  Date | Chief of Police Record  Date | Police Inspector Voucher  Date |
| Name of Car | Name of Car | Name of Car |
| Name of Owner | Name of Owner | Name of Owner |
| Address  St. & No. | Address  St. & No. | Address  St. & No. |
| City or Town  State | City or Town  State | City or Town  State |
| Engine No.  Maker's No.  Model No.  Letter  Year | Engine No.  Maker's No.  Model No.  Letter  Year | Engine No.  Maker's No.  Model No.  Letter  Year |
| From whom did you buy vehicle | From whom did you buy vehicle | From whom did you buy vehicle |
| Address  St. & No. | Address  St. & No. | Address  St. & No. |
| City or Town  State | City or Town  State | City or Town  State |
| Police Inspector's Report | Police Inspector's Report | Police Inspector's Report |
| City or Town  State | City or Town  State | City or Town  State |
| Special Identification Mark | Special Identification Mark | Special Identification Mark |
| Signature of Car Owner | | |

Inventor  
B. F. Tozier

By  E. H. Bond

Attorney

March 18, 1924.                                                    1,487,041
                              B. F. TOZIER
MEANS FOR PREVENTING VEHICLE THEFTS AND RECOVERY OF STOLEN VEHICLES
                      Filed Oct. 28, 1921        3 Sheets-Sheet 2

Registration of Motor Vehicle

| | | |
|---|---|---|
| State | City or Town | Date |
| Name of Owner | Address | St. & No. |
| Name of Vehicle Made by | | |
| Engine No. | Maker's No. | |
| Type of Vehicle | Sedan — Touring — Truck — Runabout — Motorcycle — etc. | |
| Kind of Power | Gas — Steam — etc. | |
| Truck if Commercial | Capacity Tons | Mfr's Rating |
| Model No. | Letter | Year |
| Horse Power | No. Cylinders | Bore or Diameter — Inches |
| From whom did you purchase Vehicle | | |
| Address St. & No. | City or Town | State |
| Police Inspector's Report | Yes or No | Remarks |
| Name | Police Inspector's No. if any | |
| Address St. & No. | City or Town | State |

Is this vehicle owned by Copartnership — Corporation — Association or Individual Name of Co-partnership / Corporation / Association / Individual      Address in full    St. & No.

Mail Address     St. & No.     City or Town     State

Upon transfer of any motor vehicle No. plates and Registration receipt will be taken by the Police Inspector.

Special Identification mark

No. plates will be sent to mail address by parcel post

Applicant's Signature  _____

Reg. No.

Justice of the Peace             Important
   _____        Every question must be answered Registration must be signed by
     Justice of the Peace    Notary Public  or  Special Commissioner Inventor
                                         B. F. Tozier
                              By         E. W. Bond
                                              Attorney March 18, 1924.  
B. F. TOZIER  
1,487,041

MEANS FOR PREVENTING VEHICLE-THEFTS AND RECOVERY OF STOLEN VEHICLES

Filed Oct. 28, 1921  3 Sheets-Sheet 3

National Automobile Bureau of _____  
Registration of Motor Vehicle

| State | City or Town | Date |
|---|---|---|
| Name of Owner | Address | St. & No. |

Name of Vehicle made by

Engine No.  Maker's No.

Type of Vehicle  Sedan – Touring – Truck – Runabout – Motorcycle – etc.

Kind of Power  Gas – Steam – etc.

Truck if Commercial  Capacity Tons  Mfr's. Rating

Model No.  Letter  Year

Horse Power  No. Cylinders  Bore or Diameter  Inches

From whom did you purchase Vehicle

Address  St. & No.  City or Town  State

Police Inspector's Report  Yes or No.  Remarks

Name  Police Inspector's No. if any

Address  St. & No.  City or Town  State

Is this vehicle owned by a Co-partnership – Corporation – Association or Individual Name of {Co-partnership / Corporation / Association / Individual}  address in full  St & no.

Mail address  St. & No.  City or Town  State

Upon transfer of any motor vehicle No. plates and Registration receipt will be taken by the Police Inspector Special Identification Mark No. plates will be sent to mail address by parcel post.

Applicants Signature _____

Reg. No.

Justice of the Peace  Important  
_____ Every question must be answered  
Registration must be signed by  
Justice of the Peace, Notary Public or Special Commissioner Inventor  
B. F. Tozier  
By E. H. Bond  
Attorney Patented Mar. 18, 1924.

1,487,041

UNITED STATES PATENT OFFICE.

BENJAMIN F. TOZIER, OF LYNN, MASSACHUSETTS.

MEANS FOR PREVENTING VEHICLE THEFTS AND RECOVERY OF STOLEN VEHICLES.

Application filed October 28, 1921. Serial No. 511,022.

*To all whom it may concern:*

Be it known that I, BENJAMIN F. TOZIER, a citizen of the United States, residing at Lynn, in the county of Essex and State of Massachusetts, have invented certain new and useful Improvements in Means for Preventing Vehicle Thefts and Recovery of Stolen Vehicles, of which the following is a specification.

This invention relates to means for preventing automobile thefts and for recovering the same in case perchance they should be stolen, which latter step, however, is well guarded against by my invention.

It has for a further object to insure that each city and town shall receive proper revenue for taxation at all times. By the use of my invention an automobile owner cannot dodge taxes. My improvement, therefore, not only protects the automobile owner, but safeguards the community and insures that each owner shall pay such taxes as the law provides for in such cases.

My improvement also will serve to prevent any person from obtaining any number of license plates or tags by simply stating that he owns a stated number of cars. A person must own and produce a car before he or she can obtain a license plate or tag. He cannot get his tags and then wait his opportunity to steal a car and change its tag, as is now possible.

Under my improvement I assure positive protection for the car owner, the insurance companies, the public, the police officials, the cities and towns and States, as well as the automobile dealer. In fact, the protection is universal, and by the use of my improvement the insurance rates against automobile thefts will be greatly reduced, as it greatly reduces the risk.

My present improvements embody a multiplicity of sheets or cards, one being an application blank for registration, one a blank of substantially the same character and data for use by a national automobile bureau, and the third a combined sheet or card consisting of a portion to be retained by the assessors of the town or city, and detachable coupons or receipts, one for the registrant, one for the chief of police, and another for the police inspector. The character of these various sheets, and receipts will now be described and the mode of use thereof, it being understood that the various sheets may be printed all in one piece or on a single piece of paper, or separate as may be deemed most expedient, the invention being in no wise restricted in this respect.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Figure 1 is a front face view of the sheet which goes to the assessors, with the coupons attached.

Figure 2 is a similar view of the registration blank.

Figure 3 is a similar view of the sheet that goes to the automobile bureau.

It will be understood that the coupons or receipts may form a part of either of the other sheets, or a single receipt or coupon may be a part of each sheet, as may be found most expedient, the mode of use and the result attained being the same.

In the present form of my invention 1 designates a sheet, to be herein termed the registration sheet. It has thereon the requisite data, as shown, and by reason of the information which it conveys it will, in connection with the other sheets, prevent the selling of a stolen car having the definite engine number, a definite license number, police inspector's report, and special identification mark. Also the signature of the registrant is another safeguard. This is to be executed before a notary public or justice of the peace, or other duly authorized officer.

2 designates a sheet or card, a duplicate of sheet or card 1, and this is to be known as the automobile bureau sheet or card. It is to be filled in the same as sheet or card 1. Its purpose will soon be described.

3 designates the third sheet or card which is to be known as the assessor's sheet or card. It is provided with the data shown and its purpose will be described later on. Forming a part of this sheet or card, or a part of either of the other cards or sheets or a single one on each of the cards or sheets, are coupons 4, 5 and 6. Each of these coupons bears the same information or data and these are made readily separable from the sheet to which they are attached, as by means of a line of perforations, as seen at 7, 8 and 9, in Figure 1.

One of the coupons is to be retained by the registrant, to be carried at all times in the car, one is to be retained by the chief of police, and the other by the police inspector.

The mode of use is as follows:—

All the various forms are handled by the State and distributed by the registration department to the various cities and towns.

Form No. 1 is kept by the State registration officer. Form No. 2 is kept by the bureau which is run independently for the State. Form No. 3 is sent to the board of assessors of the various cities and towns.

Form No. 4 is kept in the motor vehicle at all times. Form No. 5 is sent to the chief of police of all cities and towns.

Form No. 6 is signed by the police inspector of the cars and presented by the owner of the vehicle and receives his number from the State.

In registering or transferring a vehicle the owner notifies the chief of police, who has the vehicle examined by the inspector, as to the number on the motor, the model, the year or any other special identification mark or marks, and after having given the matter careful attention and inspection and finding the same all right and correct, he stamps or signs his name, number and address stated in the form, where so designated on coupon 6, as well as on the other coupons 4 and 5, and the board of assessor's card or sheet 3, and upon the automobile bureau card or sheet 2, and upon the registration sheet 1. He then tears off coupon 6 which he retains which is his record and evidence that the vehicle is what it is claimed to be and that it is the property of the registrant. The registrant then goes to the place where the license tags or plates are given out and where records of the registration are kept and upon presentation of his registration sheet or card properly filled out and signed by the police inspector, he receives his license plates or tags and the coupon 4 which he is supposed to keep at all times in his car as evidence that he has fully complied with the law.

The registration office keeps card or sheet 1 for future reference, and the registration officer of each State, or the duly authorized officer, will send to the chief of police of the city or town coupon 5 which is his record of registration and a preventive from any person forging any inspector's name.

The board of assessor's report or sheet 3, after the coupons have been detached, goes to the assessors of the city or town where the automobile owner lives, which enables the board of assessors to tax each and every automobile owner beyond all question of doubt and thus the said city or town is put in position to collect a revenue which in many instances is dodged, under present conditions.

The sheet or card 2 goes to the National Automobile Bureau for record, being filed away in its proper file for reference at any time.

Upon the transfer of any vehicle the registration card or sheet and the number plates shall be taken by the police inspector, as without an automobile the registration card or sheet and plates are worthless under my improvement. Thieves cannot apply them to another car.

It makes no difference where a car is stolen if the numbers have not been changed, and that car is registered any where in the United States, just as soon as registration card or sheet reaches the bureau they have the name of the police inspector, and if he has been in league with the thief, for which proper authorities can punish, the police officer and the bureau at once have the exact name and place of residence of the car and owner, and speedy recovery can be made. It is impossible to register one car under any but its proper name, for instance, one could not register a Ford for a Buick, or any other make of car.

If numbers have been changed and passed by the police inspector who should know that fact, when the registration card or sheet comes to the National Bureau and placed in the files, it is at once found out that one of the two cars having such number must have been stolen or changed to defraud the insurance company. It makes no difference what the location may be, for instance one might be No. 417, Texas, and the other No. 417, Pennsylvania; one of these must have been stolen, and the proper authorities having the name of the owner, the make of the car, the city or town in which the owner took out registration papers, and the police inspector, it is a very easy matter to locate the thief or, at least, to retain the one car until its owner can be found.

My improvement will serve to aid in the recovery of stolen cars for their owners and the insurance companies and will stop the theft of cars as it will be impossible for a person to register a car unless under special identification marks and even then it can be traced at once if they be wrong.

If a person steals a car, he can do nothing with it, for he cannot drive it except under the number thereon, as he has no license tag or plate to put on it, and he cannot get another to put on, and in order to get a new license plate he must have a car and have it inspected and prove ownership. He cannot get it registered because he has no number plate to turn over to the police inspector, or if he has the said number must correspond with the car and in that case it will be seen that the man and the car can be readily identified. Under my improvement it will be impossible for one to steal a car and operate the same in any of the States.

In the same way it will enable the proper authorities to collect the proper tax for every month in the year. For example, supposing the tax rate in a city or town to be thirty dollars per thousand. If one has a car valued at one thousand dollars, registered May 1, 1921, and uses it or transfers on July 1, 1921, that shows that he has had the same two months at the rate of two dollars and a half a month, and he should be rendered a tax bill for five dollars, and so on, the car at all times being under taxation and paying for the privilege the city or town allows.

A person could not register a stolen car because he could not produce all the evidence necessary to prove his ownership. The three sheets or cards are thus a collective safeguard against any depredation and insure a convenient form of title evidence for the car. As soon as a thief finds out that he cannot get away with a stolen car, automobile thefts throughout the country will drop to a minimum and eventually be unknown. The cost of car insurance, therefore, must drop proportionately, for the risk will be reduced to practically nil.

What is claimed as new is:—

1. A registration sheet having appropriately designated spaces for the name of the owner of a car and other data concerning said car, a corresponding sheet for the assessors bearing corresponding data, and a sheet for the use of an automobile bureau bearing co-related data, each sheet having an appropriately designated space for the signature of the party by whom the car is inspected, and coupons with data co-related to said sheets.

2. A registration sheet having appropriately designated spaces for the name of the owner of a car and other data concerning said car, a corresponding sheet for the assessors, a sheet for the use of an automobile bureau, and coupons bearing data relating to the identification of the car and corresponding to the number of sheets, one to be retained by the owner, one by the police inspector and another by the chief of police, and each so designated, with appropriately designated spaces for the signature of the person inspecting the car.

3. A registration sheet, an assessor's sheet, and an automobile bureau's sheet, each having appropriately designated spaces for the requisite data pertaining to a car, and a series of coupons detachably connected to one of said sheets by perforations, each bearing co-related data, one for the registrant, one for the chief of police, and one for the inspector, and each having appropriately designated spaces for the signature of the owner, the police inspector and the chief of police.

In testimony whereof I affix my signature.

BENJAMIN F. TOZIER.